United States Patent [19]

Rolschau

[11] 3,963,467

[45] June 15, 1976

[54] DUST FILTER APPARATUS

[76] Inventor: David W. Rolschau, 6409 Ryan Ave. South, Minneapolis, Minn. 55435

[22] Filed: Oct. 29, 1974

[21] Appl. No.: 518,248

Related U.S. Application Data

[63] Continuation of Ser. No. 339,418, March 8, 1973, abandoned.

[52] U.S. Cl. .................................. 55/284; 55/293; 55/302; 55/341 R; 55/378; 55/418
[51] Int. Cl.² .......................................... B01D 46/04
[58] Field of Search ............. 55/212, 284, 293, 302, 55/303, 341, 378, 418, 465

[56] References Cited
UNITED STATES PATENTS

| | | | |
|---|---|---|---|
| 3,057,137 | 10/1962 | Perlis et al. | 55/341 X |
| 3,394,532 | 7/1968 | Oetiker | 55/341 X |
| 3,480,330 | 11/1969 | Hirs et al. | 55/302 X |
| 3,498,030 | 3/1970 | Wilki | 55/302 |
| 3,535,852 | 10/1970 | Hirs | 55/302 |
| 3,616,614 | 11/1971 | Eisenegger | 55/302 X |
| 3,729,903 | 5/1973 | Espeel et al. | 55/341 X |
| 3,739,557 | 6/1973 | Anderson et al. | 55/302 |
| 3,832,832 | 9/1974 | Hoon, Jr. | 55/302 |

Primary Examiner—Frank W. Lutter
Assistant Examiner—Kathleen J. Prunner
Attorney, Agent, or Firm—Wicks & Nemer

[57] ABSTRACT

A dust filter apparatus includes a bag chamber having a head mounted on the top thereof and a hopper connected to the bottom thereof for receiving collected dust. The head has a dirty air inlet, a plurality of walled chambers therewithin, a back flow air plenum extending through the walled chambers and a multiplicity of filter bag supports mounted on and depending from the walled chambers in such manner as to permit communication between the walled chambers and the bag chamber. A baffle structure positioned between the head and bag chamber and below the dirty air inlet has apertures through which the bag supports extend, the structure being adjustable in a vertical plane for varying the space between the edges of the apertures and the bag supports. Each bag support has a filter bag connected to and dependeing therefrom into the bag chamber and a collar for directing the flow of air away from the top of the filter bags. An air plenum mounted on the head is formed with a clean air outlet together with means for selectively communicating the interior of the bag supports with the back flow air plenum or the clean air outlet of the air plenum.

1 Claim, 5 Drawing Figures

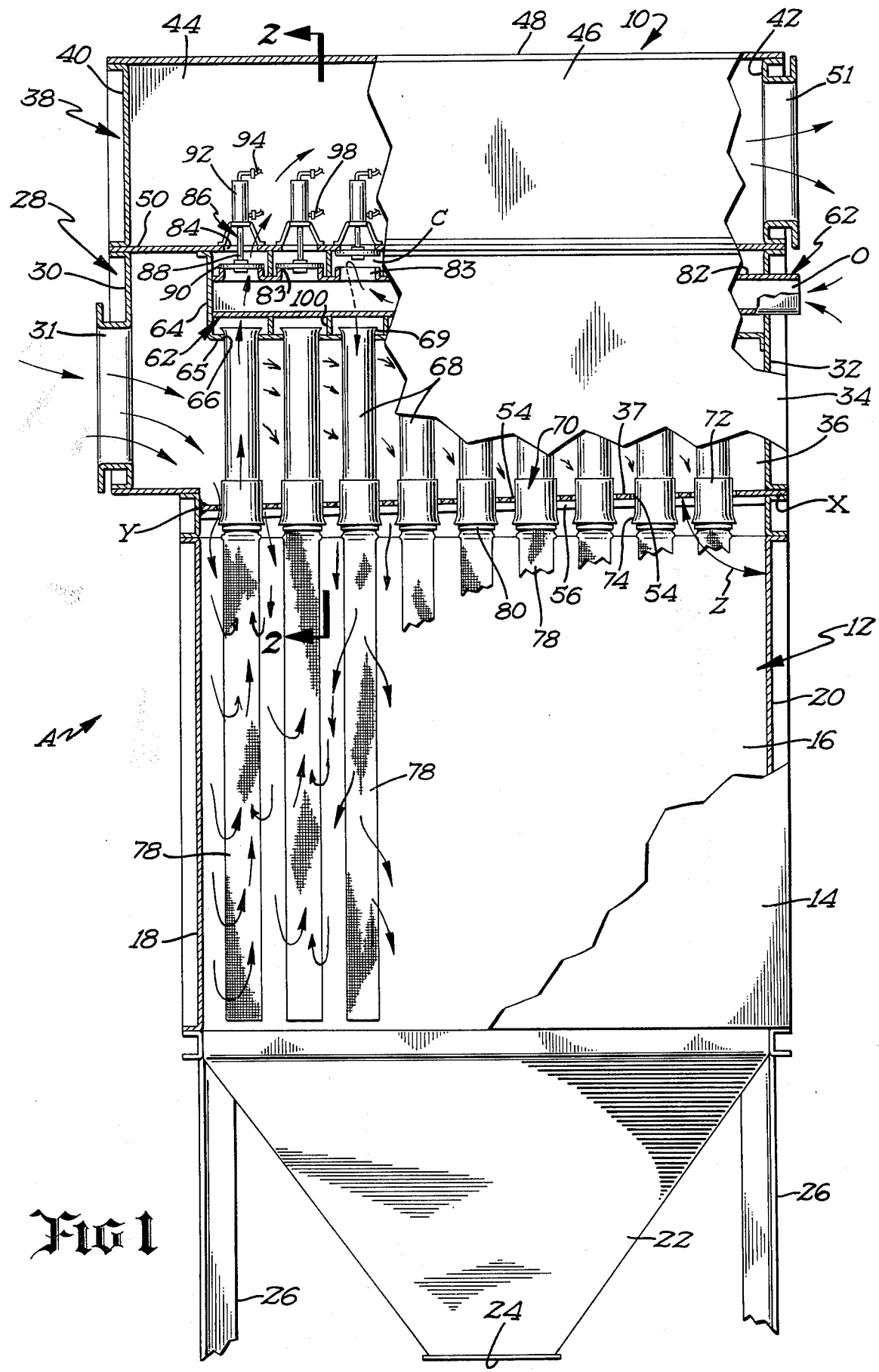

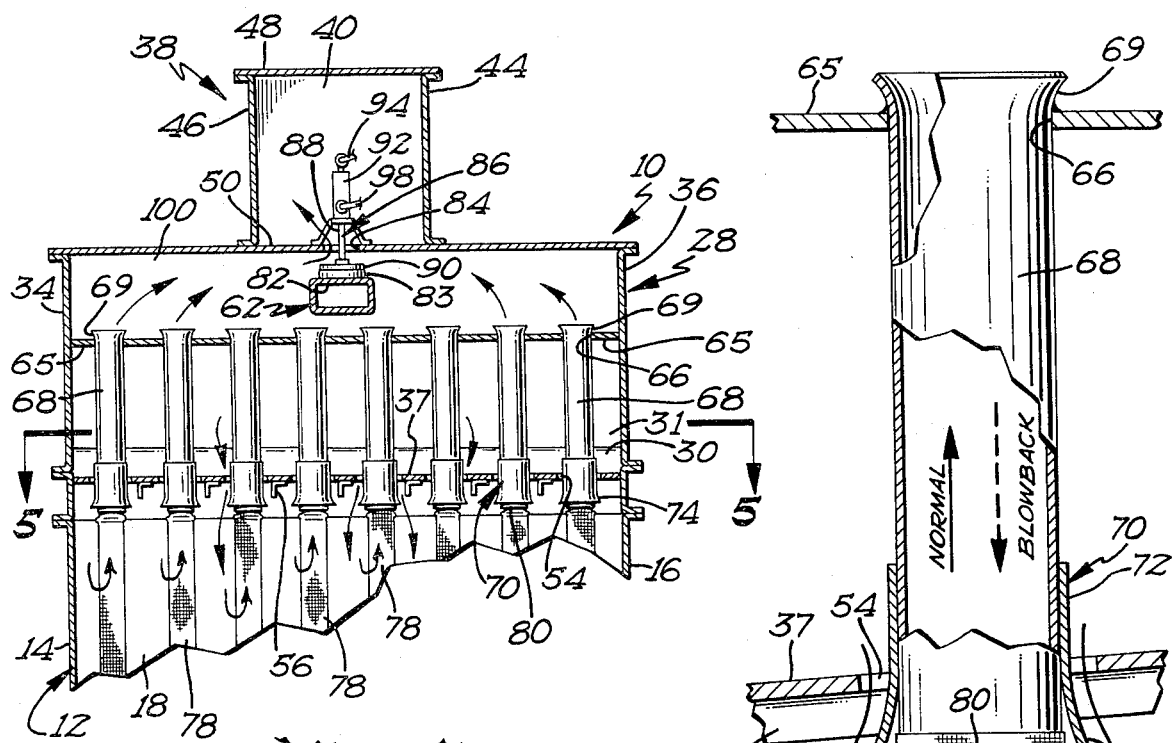
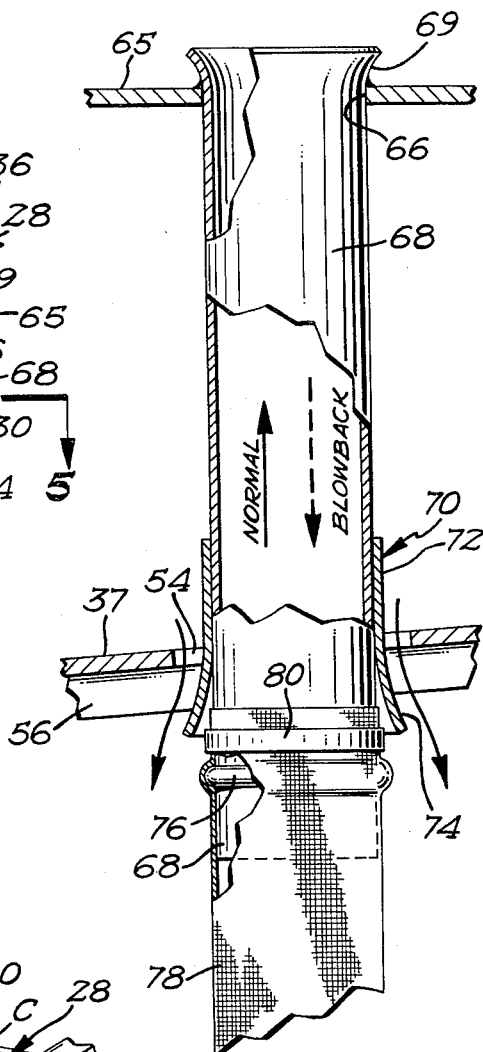
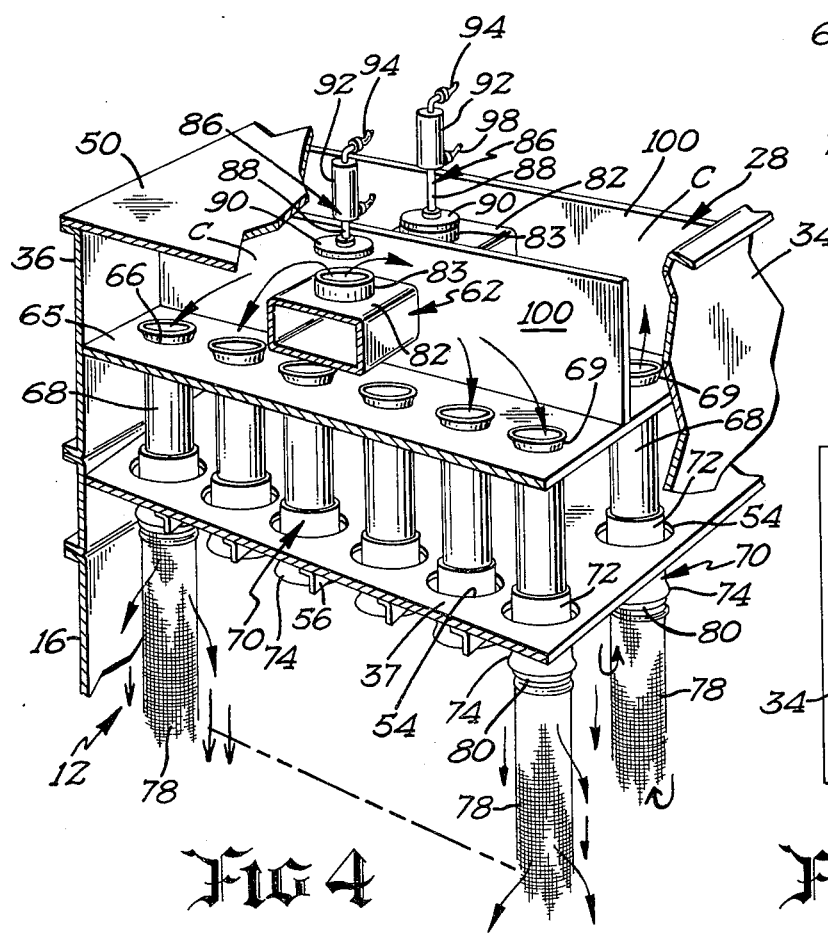
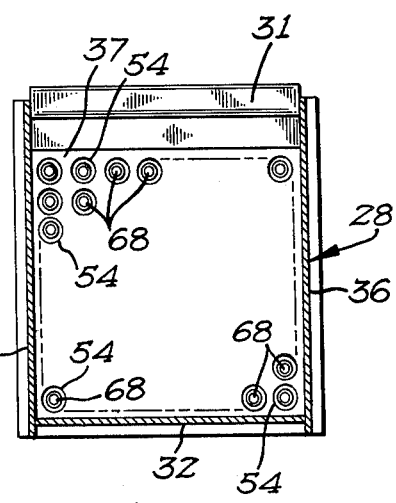

DUST FILTER APPARATUS

CROSS REFERENCE

This is a continuation of application Ser. No. 339,418 filed Mar. 8, 1973 and now abandoned.

SUMMARY OF THE INVENTION

The invention relates to an improvement in devices for filtering dust from dust laden air and collecting the same to obtain dust control in a given area. It is an object of the invention to provide a device having a bag chamber and a dirty air inlet at the top thereof whereby the dirty air is distributed to all filter bags equally at the top thereof whereby it travels downwardly upon and around the bags with substantially no cross flow about the filter bags. As the dirty air flows downwardly upon the bags, it passes through the bag wall and then goes upwardly in the bag and exits as a clean stream out the air plenum at the top of the collector device. Heavy particles, due to their own inertia and the force of gravity, fall directly into the hopper and out of the system. Fines collected at the bag surface and expelled in the back flush cycle are thrown outwardly into and combine with the above referred to incoming downward flow around the bags and out of the system. With the construction disclosed herein, air movement is negligible below the bag chamber and as a result low density or high sail area fines settle in the hopper and pass quickly out of the hopper.

Dust particles collected on the outer bag surface are periodically subjected to reverse air back flush. Dry low pressure back flush air down the inside of the filter bags gently inflates the bag envelope forcing air through the bag and cake material thereon to maintain porosity. Dust particles loosened in the back flush are blown out away from the bag and of primary importance here join the downward flow occurring on the outside of the filter bag. Back flush air can be either atmospheric or supplied by an air pressure source depending upon the application.

Additionally, the top of each filter bag is protected by a flared collar which prevents air flow from impinging on the bag.

In the drawings forming part of this application:

FIG. 1 is a longitudinal sectional view of a continuous cleaning baghouse filter collector embodying the invention, portions thereof being broken away, with some of the filter bags removed.

FIG. 2 is a transverse section on the line 2—2 of FIG. 1.

FIG. 3 is a sectional view through one of the bag supports and showing a portion of a filter bag connected to the support.

FIG. 4 is a partial perspective view of the filter bag support plate, the back flow air plenum and back flow damper air cylinders, and division walls, with the air back flow shown in arrows.

FIG. 5 is a sectional view on the line 5—5 of FIG. 2.

Referring to the drawings in detail, the air filter device A includes the overall housing 10. The housing includes the central bag chamber 12 formed of the side walls 14 and 16 and the end walls 18 and 20. Connected to and depending from the bottom of the central chamber is the hopper 22 formed with the dust outlet 24. The device A is supported by the four legs 26 connected to and depending from the upper edge of the hopper.

The numeral 28 designates the head which is mounted on the upper end of the central chamber 12 and it includes the end walls 30 and 32 and the side wall portions 34 and 36. Formed in the end wall 30 is the dirty air inlet opening 31 which is above the baffle structure which may be in the form of the plate 37 hereinafter referred to. The position of the dirty air inlet provides a down draft inlet, i.e., the dirty air enters the unit at the bag supports at the tops of the bags. Mounted on the top of the head 28 is the air plenum 38 which includes the end walls 40 and 42, the side walls 44 and 46, top cover 48, and the floor wall 50. The end wall 42 is formed with the clean air discharge opening 51 which is connected to a conventional source of vacuum not shown. An alternate arrangement using pressurized dirty inlet air and a pressurized back flow source may be used.

The baffle structure plate 37 is fixedly secured at one end as at $x$ to the upper end of the central chamber 12 and at the bottom of the wall 32 of the head 28. The baffle structure plate 37 is formed with a multiplicity of apertures 54 in rows. The structure 37 is movable upon a horizontal axis at the other end as at $y$ in a vertical direction but secured to the wall 14 as an ordinate built to a specific which will be explained hereinafter. The baffle structure 37 is strengthened by the spaced elongated angle supports 56 connected to the underside of the baffle structure.

The numeral 62 designates a tubular back flow air plenum secured at one end to the end wall 64 which closes off the end of the plenum and with the other end of the plenum 62 secured to the end wall 32 of the chamber and open to the atmosphere as at O. The plenum extends centrally of the head 28 and at a right angle to the rows of the filter supports hereinafter described. Connected at one end to the end wall 64 and within the head 28 and beneath the air plenum is the support plate 65. The plate 65 is connected at the other end to the wall 32 of the head 28 and is also connected to the side walls 34 and 36. The plate 65 is formed with a multiplicity of holes 66 which are in vertical alignment with the apertures 54 of the baffle structure 37.

Further provided are the tubular cage supports 68 for filter bags each of which is formed with the flared upper end portions 69. Each of the supports 68 extends through and depends from a hole 66 with the flared end 69 upon the plate 65 and secured at the hole by spot welding or the like. Each of the supports 68 extends axially through an aperture 54 of structure 37 to a point below the structure plate 37. The plate 65 is so positioned so that the supports 68 are in horizontal alignment with the dirty air inlet 34.

Spaced from the lower end of a support 68 is a deflector shield 70 which includes the tubular portion 72 secured to the support 68 with the flared lower end portion 74 which begins substantially at the aperture 54, extending below the aperture. The diameter of the tubular portion 72 of the shield 70 is less than the diameter of the aperture 54 to allow and regulate flow downwardly and annularly about the bags as indicated by the arrows in FIGS. 1 and 3. The deflector shield 70 prevents impinging flow of the dust laden air onto the filter bag connection below it, thus lengthening the life of the bag. The lower end portion of the tubular support is formed with the annular raised bead 76 over which the filter bag 78 is positioned with the small take-up band 80 securing the bag at a point above the bead 76 with the band 80 just below the lower end of the shield 70.

The top wall 82 of the back flow plenum 62 is formed with the upstanding spaced ports 83 each of which overlies a row of bag supports 68, particularly FIGS. 1 and 4. Formed in the floor wall 50 of the clean air plenum 38 are the ports 84 each of which is above and in alignment with a port 83. Further provided for each of the companion ports 83 and 84 is the valve 86 with the stem 88 and the plate 90. The stem 88 extends into an air actuated cylinder 92 with a piston on the end of the stem. The cylinder 92 is provided with the air lines 94 and 98 actuated by conventional means not shown which moves the valve from a closed position on the port 83 to a closed position on the port 84. When the valve 86 is closed upon the port 83 there is continuous air filtering, but when the valve 86 is closed upon the port 84 there is a back wash as hereinafter explained.

Additionally provided are the spaced dividing walls 100 which extend transversely of the head 28 from the side wall 34 to the side wall 36 so spaced that a valve 86 is between each pair of walls 100. A pair of dividing walls 100, the plate 65 therebetween, and the floor 50 in each instance forms a chamber C in communication with the upper open ends of a row of bag supports.

It will be seen that with the baffle structure 37 positioned so that the angle between the plate and the wall 20 is less than 90° as at Z, the structure is disposed slightly obliquely downwardly from right to left and as a result the clearance between the structure 37 at the apertures 54 and the deflector shield 70 of the tubular bag supports 68 is less at the left, FIG. 1, than at the right. Put another way, the angular disposition of the baffle structure 37 to the supports 68 progressively reduces the aperture areas from right to left, FIG. 1 relative to the supports 68. This compensates for the fact that the pressure at the apertures 54 is greater at the left and progressively less at the apertures at the right, FIG. 1. Additionally, the above produces a balance of air flow through all the apertures which prevents turbulence in the hopper 22. Put another way, the dust laden air entering the top of the bag chamber is distributed to all bags substantially equally.

OPERATION

The device A operates in the following manner:

The valves 86 are closed upon the ports 83, thereby leaving the ports 84 open. Dust laden air enters the inlet opening 31 of the head 28 due to a vacuum or lower pressure area created at outlet 51 and travels across and around all the bag supports 68 and downwardly through the apertures and upon the filter bags with the air passing through the walls of the bag and making in effect a U-turn and going upwardly inside the bags as indicated by the arrows in FIG. 1. Dust collects on the outer surface of the bags. Cleaned air travels upwardly through the filter bags and the tubular supports 68, around the back flow air plenum 62, through the open ports 84 and out the clean air outlet 51 of the plenum 38. It will be seen that with the construction disclosed, air is brought in across all of the supports 68 at the tops of the filter bags with the subsequent flow down around the bags which assists in bag cleaning when the back flow is caused to exist in the filter bags as will be described hereinafter. Dust fines are collected upon the outside of the filter bags. Heavy particles of dust due to their own inertia and the force of gravity fall directly into the hopper.

To periodically remove the collected dust off the outside of the filter bags and direct the same down into the hopper 22, one valve 86 is closed at a time upon a port 84 such as in FIG. 1 which opens a companion port 83 as shown in FIG. 4 thus allowing pressurized air which may be atmospheric to enter the plenum 62 and flow out the port 83 and downwardly through the supports 68 and filter bags 78, particularly FIGS. 1 and 4. The back flush valves 86 are each operated by conventional vertical, double acting solenoid (not shown) controlled air cylinders 92, the solenoid not being shown. The solenoids are sequenced by a conventional solid state 110 volt adjustable tiimer, (not shown). The pressurized air then travels downwardly in the inside of the filter bags and out through the bag wall where it joins the previously mentioned downdraft inlet air stream and is moved downwardly thereby loosening and blowing the collected dust off the bags. The loosened dust enters the aforementioned downdraft inlet air stream and is pushed downwardly to the hopper 22 for collection. Back flush air can be either atmospheric or supplied by a pressure fan depending on the application. When this blow back occurs downwardly in the bags, it will be noted that it is in conjunction with the incoming air which also travels downwardly upon the bag as heretofore mentioned. Additionally, in the blow back operation, the loosened dust particles enter the incoming falling stream of air which exists around the bag and is thus assisted downwardly to the hopper. Thus both the incoming air and the blow back air travel down to push the loosened dust downwardly to the hopper 22 which is an area of minimal disturbance due to the construction.

The downdraft energy, which approximates half of the total bag cleaning energy, favorably affects collector performance without shortening bag life.

With the construction disclosed there is substantially no air movement below the bag chamber 12, therefore low density or high sail area fines easily settle to the hopper and pass quickly out of the collector.

What is claimed is:

1. A dust filter apparatus comprising:
   a. a bag chamber,
   b. a head mounted on said bag chamber,
   c. said head having a dirty air inlet,
   d. an air plenum mounted on said head with a common wall between said head and said air plenum,
   e. said air plenum having a clean air discharge opening,
   f. a back flow air plenum mounted within said head and extending at one end therefrom,
   g. a multiplicity of walled chambers mounted in said head and extending transversely thereof and through which said back flow air plenum extends,
   h. a multiplicity of tubular bag supports mounted on and depending from said walled chambers and communicating with said walled chambers and said bag chamber and in alignment with said dirty air inlet,
   i. each of said tubular bag supports having a filter bag connected to and depending therefrom into said bag chamber,
   j. means mounted on said back flow air plenum and said common wall for selectively communicating the interior of said bag supports with said back flow air plenum or alternatively with said air plenum and the clean air outlet thereof, said selective means including, k. first ports formed in said back flow air plenum, and
l. second ports formed in said common wall in alignment with said first ports, and
m. valve means for closing or opening either of said first or second ports,
n. means for causing a low pressure area at said clean air outlet to cause air to flow from said dirty air inlet downwardly upon, through and upwardly within said filter-bags and through said head and said air plenum for exit out said clean air outlet.
o. means for causing a pressurized reverse air flow condition within the bag supports and outwardly through the bags and downwardly with said first mentioned downward airflow,
p. means having apertures through which said bag supports extend, said means being positioned below said dirty air inlet,
q. the area of said apertures being sized so as to create a pressure drop between the head and bag chamber thereby forcing the air to be distributed substantially equally across the head and to flow downwardly through the apertures and into the bag chamber, and
r. a hopper connected to said bag chamber for receiving collected dust.

* * * * *